(No Model.)
J. S. CAMDEN.
MEASURING VESSEL.
No. 486,762. Patented Nov. 22, 1892.
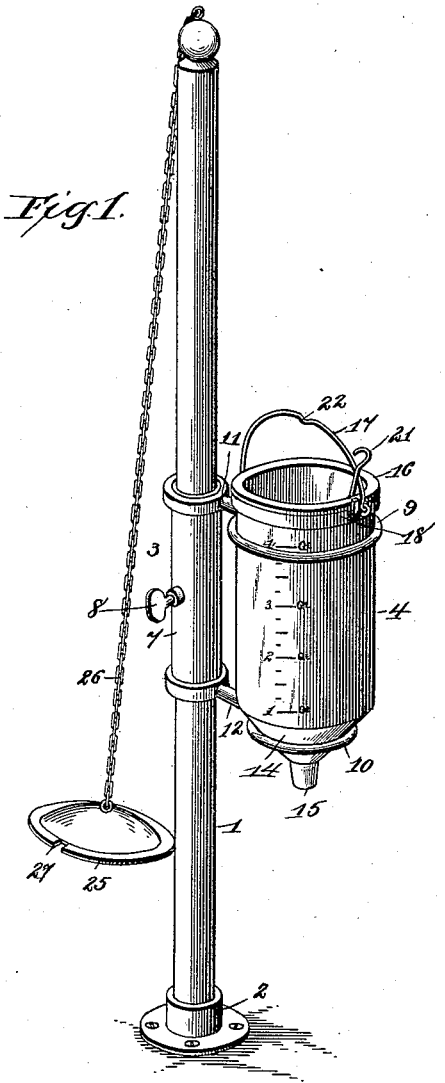
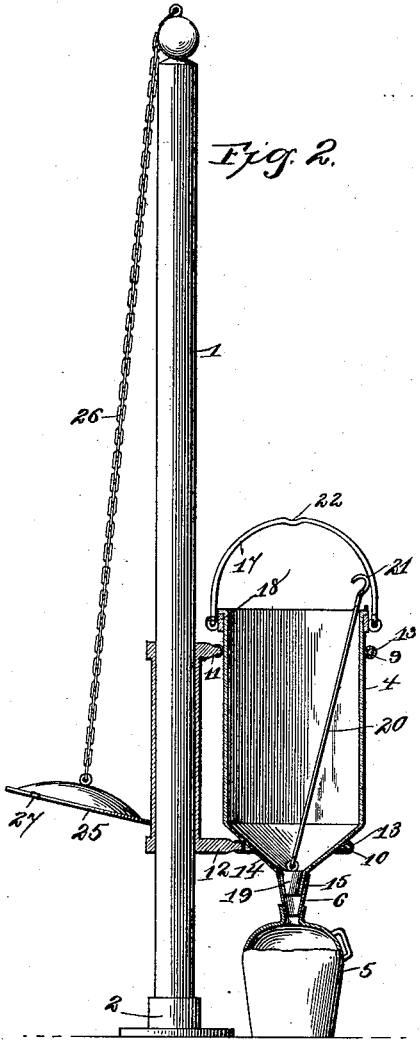
Witnesses
E. C. Wurdeman
N. F. Riley
Inventor
John S. Camden
By his Attorneys,
C. A. Snow & Co.
THE NORRIS PETERS CO., PHOTO-LITHO., WASHINGTON, D. C.

UNITED STATES PATENT OFFICE.

JOHN S. CAMDEN, OF PARKERSBURG, WEST VIRGINIA.

MEASURING-VESSEL.

SPECIFICATION forming part of Letters Patent No. 486,762, dated November 22, 1892.

Application filed June 30, 1892. Serial No. 438,594. (No model.)

*To all whom it may concern:*

Be it known that I, JOHN S. CAMDEN, a citizen of the United States, residing at Parkersburg, in the county of Wood and State of West Virginia, have invented a new and useful Measuring-Vessel, of which the following is a specification.

The invention relates to improvements in measuring-vessels.

The object of the present invention is to provide a measuring-vessel by which liquids may be readily drawn in the desired quantities and conveniently emptied into jugs and similar small-mouthed receptacles without requiring the attention of the salesman while such liquids, especially heavy ones like molasses, are drained.

The invention consists in the construction and novel combination and arrangement of parts hereinafter fully described, illustrated in the accompanying drawings, and pointed out in the claim hereto appended.

In the drawings, Figure 1 is a perspective view of a measuring-vessel constructed in accordance with this invention. Fig. 2 is a longitudinal sectional view.

Like numerals of reference indicate corresponding parts in both the figures of the drawings.

1 designates a standard rising from a base 2 and having vertically adjustable on it a measuring-vessel holder 3, which receives a measuring-vessel 4, and which is adapted to elevate the vessel to the desired height, so that it may empty into a jug 5 or other small receptacle with the assistance of funnels 6. The adjustable holder consists of a sleeve 7, which is mounted on the standard, and which is secured at any desired adjustment by a set-screw 8, and upper and lower rings 9 and 10, which are connected with the sleeve 7 at the ends thereof by stems 11 and 12. The rings are horizontally disposed, and are provided with rubber coverings 13 to avoid injuring the vessel 4, which is made of glass and which is graduated. The upper ring encircles the vessel near the top thereof, and the lower ring, which is smaller than he upper one, is arranged beneath the bottom of the vessel and supports the latter.

The vessel 4 is cylindrical and is provided with a tapering bottom 14 and a depending or contracted portion or tube 15, which is adapted to be arranged over a funnel to direct the contents of the graduated vessel into the same. A horizontal annular flange 16 is provided at the top of the vessel, and the latter is carried by a bail 17, which has its ends pivoted to a band 18, arranged beneath the annular flange. While the liquid is being drawn from a barrel or the like the bottom of the graduated vessel is closed by a stopper 19, which is connected to the lower end of a rod 20, and the latter is provided at its upper end with a hook 21, which, when the stopper is not in use, is engaged with a bend 22 of the bail, whereby the stopper is held up from the bottom of the graduated vessel. The vessel is closed at the top while draining, to exclude dust, dirt, insects, and the like, by a cover 25, which is connected with the top of the standard by a chain 26, and which is provided at its periphery with a recess 27 to receive the stopper-rod. The bail is prevented swinging down upon the stopper-rod by stops arranged on the band, whereby the bail is allowed to rest upon one side of the band and is prevented swinging to the opposite side.

It will be seen that a simple and comparatively-inexpensive measuring-vessel is provided and that the same is adapted to enable liquids to be drawn in the desired quantities and to be readily emptied into vessels having small mouths without requiring the continuous attention of a salesman while such liquids are drained.

What I claim is—

Measuring apparatus comprising a standard, a vertically-adjustable holder mounted on the standard, a receptacle provided at its bottom with a depending tubular portion and having at its top a horizontal annular flange, a band surrounding the receptacle and arranged beneath the flange, a bail having its ends pivoted to the band and provided intermediate of its ends with a bend, a stopper for closing the tubular portion, and a stopper-rod having its lower end connected to the stopper and provided at its upper end with a hook to engage the bend of the bail to hold the stopper above the bottom of the vessel, substantially as described.

In testimony that I claim the foregoing as my own I have hereto affixed my signature in the presence of two witnesses.

JNO. S. CAMDEN.

Witnesses:
 BERNICE A. WOOD,
 JOHN H. SIGGERS.